(12) United States Patent
Sixel et al.

(10) Patent No.: US 12,228,471 B2
(45) Date of Patent: Feb. 18, 2025

(54) NOx SENSOR MONITORING

(71) Applicant: Caterpillar Motoren GmbH & Co. KG, Kiel (DE)

(72) Inventors: Eike Sixel, Kiel (DE); Andreas Banck, Altenholz (DE); Hauke Holst, Dänischenhagen (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 18/288,075

(22) PCT Filed: Apr. 21, 2022

(86) PCT No.: PCT/EP2022/025165
§ 371 (c)(1),
(2) Date: Oct. 24, 2023

(87) PCT Pub. No.: WO2022/228717
PCT Pub. Date: Nov. 3, 2022

(65) Prior Publication Data
US 2024/0210279 A1    Jun. 27, 2024

(30) Foreign Application Priority Data
Apr. 26, 2021 (GB) ..................................... 2105934

(51) Int. Cl.
*G01M 15/10*    (2006.01)
*F01N 11/00*    (2006.01)
(Continued)

(52) U.S. Cl.
CPC ......... *G01M 15/102* (2013.01); *F01N 11/007* (2013.01); *F01N 2550/02* (2013.01);
(Continued)

(58) Field of Classification Search
CPC combination set(s) only.
See application file for complete search history.

(56) References Cited

U.S. PATENT DOCUMENTS 9,670,817 B2    6/2017    Yoo et al.
10,845,332 B2   11/2020   Knoefler et al.
(Continued)

FOREIGN PATENT DOCUMENTS

CN    104791119 B    7/2017
DE    102019210739 A1    8/2020
(Continued)

OTHER PUBLICATIONS

Great Britain Search Report related to Application No. GB2105934.0: reported on Sep. 18, 2021.
(Continued)

*Primary Examiner* — Binh Q Tran

(57) ABSTRACT

The present invention pertains to a system for monitoring measured NOx values in an exhaust component, comprising a first NOx sensor having a first predetermined maintenance interval and a second NOx sensor having a second predetermined maintenance interval. The first and second NOx sensors are configured such that their first and second maintenance intervals are staggered. The present invention furthermore pertains to a method for monitoring measured NOx values in an exhaust component, comprising the steps of installing a first NOx sensor having a first predetermined maintenance interval in an exhaust component installing a second NOx sensor having a second predetermined maintenance interval after the first NOx sensor has been operating for a predetermined operation duration such that the first and second maintenance intervals are staggered by a maintenance timing offset.

17 Claims, 4 Drawing Sheets

(51) Int. Cl.
  *F02B 77/08* (2006.01)
  *G08B 21/18* (2006.01)
(52) U.S. Cl.
  CPC .. *F01N 2900/04* (2013.01); *F01N 2900/0418* (2013.01); *F01N 2900/0422* (2013.01); *F02B 77/083* (2013.01); *F02B 77/086* (2013.01); *G08B 21/182* (2013.01)

(56) References Cited

U.S. PATENT DOCUMENTS

| | | | |
|---|---|---|---|
| 11,466,636 B1* | 10/2022 | Van Nieuwstadt | F02D 41/2474 |
| 2005/0103000 A1 | 5/2005 | Nieuwstadt et al. | |
| 2009/0139210 A1 | 6/2009 | Sanchez | |
| 2009/0173140 A1* | 7/2009 | Sumitani | G01N 33/0037 73/23.31 |
| 2011/0016849 A1* | 1/2011 | Runde | F02D 41/1465 60/276 |
| 2011/0252767 A1* | 10/2011 | Lin | F02D 41/1441 60/277 |
| 2014/0360166 A1* | 12/2014 | Chandrasekaran | F02D 41/222 60/274 |
| 2017/0241321 A1* | 8/2017 | Yoo | G01M 15/102 |
| 2018/0179978 A1 | 6/2018 | Sakumoto | |
| 2018/0328252 A1* | 11/2018 | Oomukai | F01N 3/0842 |
| 2021/0398363 A1* | 12/2021 | Olalere | G06Q 10/20 |

FOREIGN PATENT DOCUMENTS

| | | |
|---|---|---|
| EP | 1717423 A1 | 11/2006 |
| WO | 2020074446 A1 | 4/2020 |

OTHER PUBLICATIONS

International Search Report related to Application No. PCT/EP2022/025165; reported on Aug. 11, 2022.

* cited by examiner

NOx SENSOR MONITORING

CROSS-REFERENCE TO RELATED APPLICATION

This application is a USC § 371 US National Stage filing International Application No. PCT/EP2022/025165 filed on Apr. 21, 2022 which claims priority under the Paris Convention to Great Britain Patent Application 2105934.0 filed on Apr. 26, 2021.

TECHNICAL FIELD

Embodiments of the present disclosure relate to a system for monitoring measured NOx values in an exhaust component, comprising a first NOx sensor having a first predetermined maintenance interval and a second NOx sensor having a second predetermined maintenance interval. Some embodiments of the present disclosure relate to a method for monitoring measured NOx values in an exhaust component.

Technological Background

In exhaust components, NOx sensor readings can drift irreversibly due to wear or operation in a non-specified way.

Beside short-term NOx sensor irregularities, irreversible, or long-term NOx sensor drifts may occur. The latter can be triggered by several phenomena such as general NOx sensor aging, causing a variation in the responding baseline and sensor sensitivity, change in chemisorption and a corresponding change in the response characteristic of NOx sensor as well as thermomechanical degradation and sensor poisoning.

A NOx sensor drift usually materializes in a slow change of the sensor reading without a corresponding change of the underlying NOx value to be measured. NOx sensor drifts are not easy to detect and are thus a potential source of false NOx value measurements during operation.

When the sensor is used as a feedback device in an exhaust gas system, sensor drifts are inadmissible.

To tackle the detection of NOx sensor drifts, implementing a predefined threshold of acceptable NOx values is known in the state of the art. Following this monitoring approach, NOx values measured outside said threshold are then interpreted as NOx sensor malfunctioning due to sensor drift. However, for as long as the NOx sensor drift stays below said predefined threshold, the NOx sensor drift remains undetected.

Apart from being expensive, complex, and thus susceptible to failure, such NOx sensor evaluation is limited to the probed gas composition. No conclusion can be drawn covering the entire range of NOx concentrations the NOx sensor is exposed to during operation. Prior art systems and methods for monitoring measured NOx values may still be improved by providing more sophisticated or improved systems and monitoring methods.

SUMMARY OF THE INVENTION

Starting from the prior art, it is an objective to provide a simple, cost-effective and reliable system for monitoring measured NOx values, which allows monitoring NOx values over a wide range of NOx concentrations.

This objective is solved by means of a system for monitoring measured NOx values in an exhaust component with the features of claim 1. Preferred embodiments are set forth in the present specification, the Figures as well as the dependent claims.

Accordingly, a system for monitoring measured NOx values in an exhaust component is provided. The system comprises a first NOx sensor having a first predetermined maintenance interval and a second NOx sensor having a second predetermined maintenance interval. The first and second NOx sensors are configured such that their first and second maintenance intervals are staggered.

Furthermore, a method for monitoring measured NOx values in an exhaust component is provided, comprising the steps of installing a first NOx sensor having a first predetermined maintenance interval in an exhaust component, installing a second NOx sensor having a second predetermined maintenance interval after the first NOx sensor has been operating for a predetermined operation duration such that the first and second maintenance intervals are staggered.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
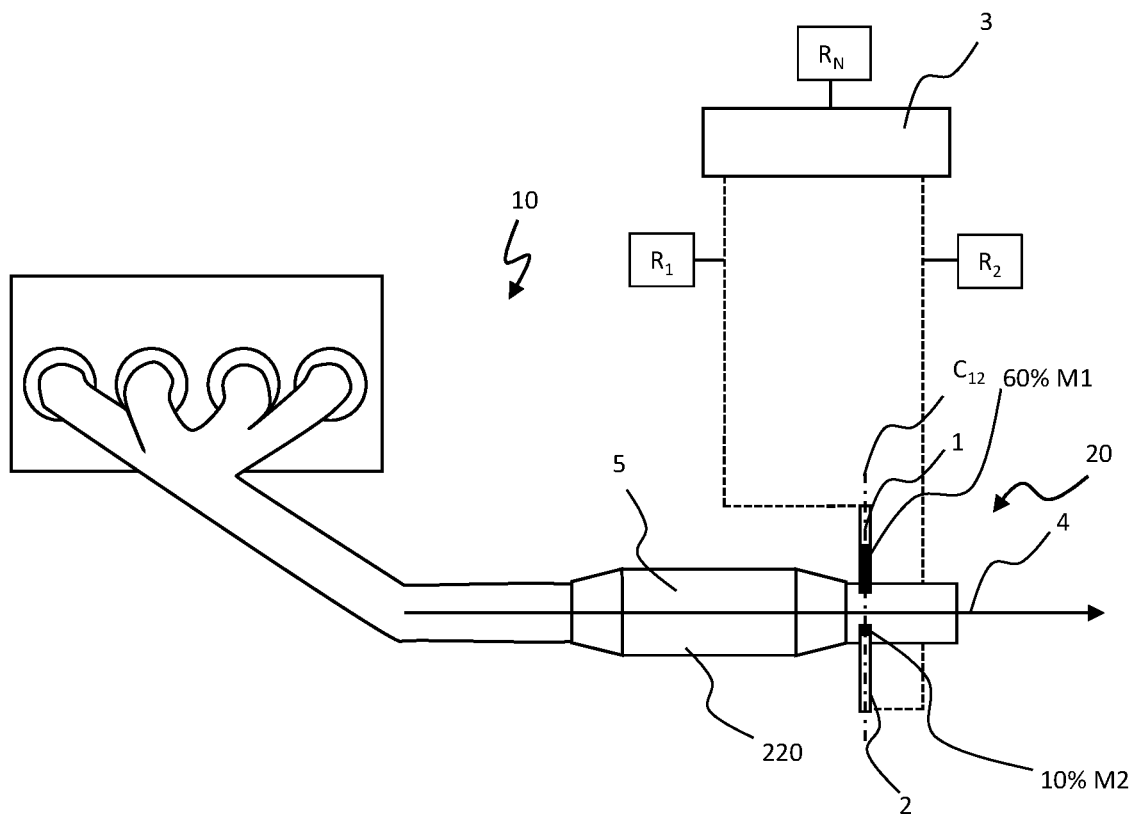
FIG. 1 schematically shows a system for monitoring measured NOx values in an exhaust component according to an embodiment.

In the following, the invention will be explained in more detail with reference to the accompanying Figures. In the Figures, like elements are denoted by identical reference numerals and repeated description thereof may be omitted in order to avoid redundancies.

The present disclosure is generally directed towards a system for monitoring measured NOx values in an exhaust component. According to embodiments of the present disclosure, the system provides a simple, cost-effective and reliable system for monitoring measured NOx values, which allows monitoring NOx values over a wide range of NOx concentration. In particular, the system is suitable for a wide range of different configurations of a multitude of NOx sensors present in the exhaust component.

The basic systems for monitoring measured NOx values in an exhaust component are well known to a person skilled in the art and are thus not further specified. Rather, characteristics of the system for monitoring measured NOx values on the basis of a first and a second NOx sensor which are configured such that the first and second maintenance intervals are staggered by a maintenance interval offset are addressed and specified in the following.

Thereto, the present invention and its underlying principles are explained exemplary for a system for monitoring measured NOx values in an exhaust component.

FIG. 1 schematically illustrates a system 10 for monitoring measured NOx values in an exhaust component 20. The system 10 may comprise a first NOx sensor 1 having a first predetermined maintenance interval M1 and a second NOx sensor 2 having a second predetermined maintenance interval M2. The first and second NOx sensors 1; 2 may be configured such that their first and second maintenance intervals M1; M2 are staggered.

The first and second NOx sensors 1; 2 shown in FIG. 1 differ from each other in that their maintenance intervals M1; M2 are offset from each other by a maintenance timing offset. This offset is illustrated by the different fill-levels of the first and second NOx sensors 1; 2. As illustrated in FIG. 1, the first NOx sensor 1 is currently at 60% of its maintenance interval M1. Correspondingly, the second NOx sensor 2 is currently at 10% of its maintenance interval M2. Therefore, the first and second NOx sensors 1; 2 have a predetermined maintenance timing offset $M_{off}$ of 50% to one another (not shown in FIG. 1). To this end, according to the embodiment shown in FIG. 1, the first and second predetermined maintenance intervals M1; M2 of the first and second sensors 1; 2 are identical. In the shown case, the predetermined maintenance timing offset $M_{off}$ is one half of the maintenance interval M1; M2. According to this embodiment the predetermined maintenance timing offset of 50% remains constant with increasing operation times. Assuming that the resulting maintenance interval of the system is defined by the sum of maintenance events triggered by the first and second NOx sensor, providing a maintenance timing offset of 50% allows constant total maintenance intervals.

The predetermined first maintenance interval M1 of the first NOx sensor 1 and the predetermined second maintenance interval M2 of the second NOx sensor 2 may both be 3000 h. Therefore, their first and second maintenance intervals M1; M2 may be staggered by a maintenance timing offset $M_{off}$ of $1500h$, which is one half of the first and second predetermined maintenance intervals M1; M2.

Thus, the term staggered refers to the offset of the first and second NOx sensors 1; 2 with respect to the individual completion of their predetermined maintenance intervals M1 and M2. The term staggered by a maintenance timing offset $M_{off}$ refers to the difference in operation hours a given NOx sensor has completed relative to another NOx sensor present in the exhaust component 20.

The system shown in FIG. 1 may further comprise control means 3 configured to issue an alarm if a difference $R_{12}$ between a highest readout $R_1$ of the first NOx sensor 1 and a highest readout $R_2$ of the second NOx sensor 2 is higher than a predefined value RN.

The first and second NOx sensors 1; 2 may be installed at a same cross-section $C_{12}$ of an exhaust component 20 along an exhaust gas flow path 4. In the shown embodiment, the first NOx sensor 1 is installed opposite of the second NOx sensor 2 in the cross-section $C_{12}$ of the exhaust component 20. Alternatively, the first and second NOx sensors may be arranged within close proximity to one another.

Additionally or alternatively, any readout of the second NOx sensor 2 may be used to monitor the operability of the first NOx sensor 1. This readout of the second NOx sensor 2 may for example be the highest readout $R_2$ of the second NOx sensor 2. Likewise, any readout of the first NOx sensor 1 may be used to monitor the operability of the second NOx sensor 2. This readout of the first NOx sensor 1 may for example be the highest readout $R_1$ of the first NOx sensor 1. Thus, it is possible to monitor a "used" NOx sensor by means of a knowingly "fresh" NOx sensor. Since both sensors measure exhaust gas at the same cross-section, a greater validity may be assigned the "fresh" NOx sensor due to its unused condition, which may then be used as a basis for a validation of the "used" NOx sensor. Thereby, operation safety may be improved further.

The second NOx sensor 2 may be configured to be exposed to exhaust gas only for a predetermined duration in the corresponding second predetermined maintenance interval M2. Further, the second predetermined maintenance interval M2 may contain more operating hours than the first predetermined maintenance interval M1. The first and second NOx sensors 1; 2 may be installed downstream of a catalyst 5. The catalyst 5 may be a catalyst of the selective catalytic reduction SCR type.

Figure 2:
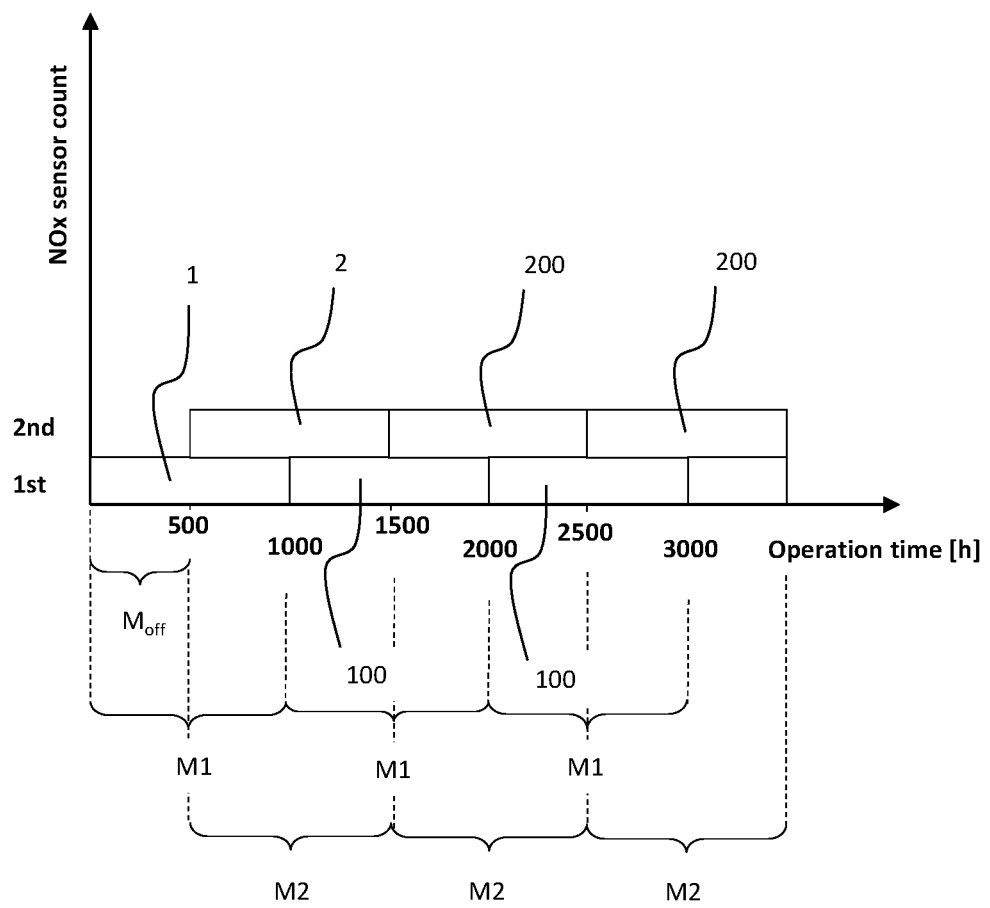
FIG. 2 schematically shows a diagram illustrating the presence of different sensors in the exhaust component as a function of operation time.

In FIG. 2, a diagram is shown, illustrating the presence of different sensors in the exhaust component as a function of operation time. As can be seen, in the beginning, only the first NOx sensor 1 may be present until its operation time meets the predefined maintenance timing offset $M_{off}$ which may be defined as $500h$. The $500h$ mark may represent one half of the first maintenance interval M1 of the first sensor 1. Likewise, the first and second maintenance intervals M1 and M2 of the first and second NOx sensors 1 and 2 are identical and set to 3000 h operation time. At the time the first NOx sensor 1 reaches 1500 h operation time, a second NOx sensor 2 may be installed. Hence, for operation times greater than 500 h, a second NOx sensor 2 will be present in the exhaust component 20. Accordingly, the first and second NOx sensors 1; 2 are staggered by a maintenance timing offset $M_{off}$. In other words, the first and second NOx sensors have a different maintenance schedule which may be offset by a predetermined maintenance timing offset $M_{off}$.

The advantages of having staggered NOx sensor go beyond of the effect of merely providing a redundant or duplicating NOx sensor. Due to their difference in operation time, a "fresh" NOx sensor and a "used" NOx sensor may provide NOx values for an identical time and place in the exhaust component during operation. Thereby, potential NOx sensor drifts of each of the first and second NOx sensors 1 and 2 may effectively be detected by monitoring the NOx values measured by two NOx sensors having staggered maintenance intervals.

Figure 3:
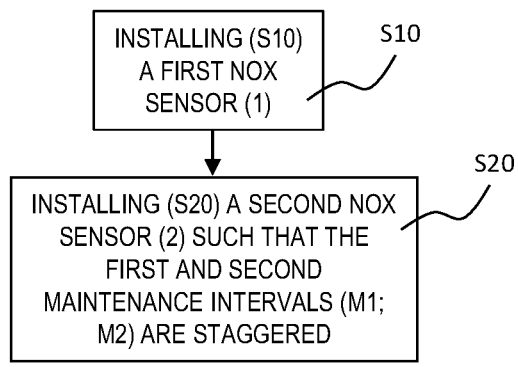
FIG. 3 shows a flow diagram depicting a method according to an embodiment.

Referring to FIG. 3, a schematic flow diagram of a method according to an embodiment is shown. In a first step S10, a first NOx sensor 1 having a first predetermined maintenance interval M1 in an exhaust component 20 may be installed. Installing may include exposing a sensitive measurement interface of the first NOx sensor 1 to an exhaust gas to be measured. During step S10, only the first NOx sensor 1 may be active during operation of an exhaust component 20. Hereto, the same definitions as provided before in the context of FIGS. 1 and 2 apply.

In a second step S20, a second NOx sensor 2 having a second predetermined maintenance interval M2 may be installed after the first NOx sensor 1 has been operating for a predetermined operation duration such that the first and second maintenance intervals M1; M2 may be staggered by a maintenance timing offset $M_{off}$. Again, the same definitions as provided before in the context of FIGS. 1 and 2 apply.

Figure 4:
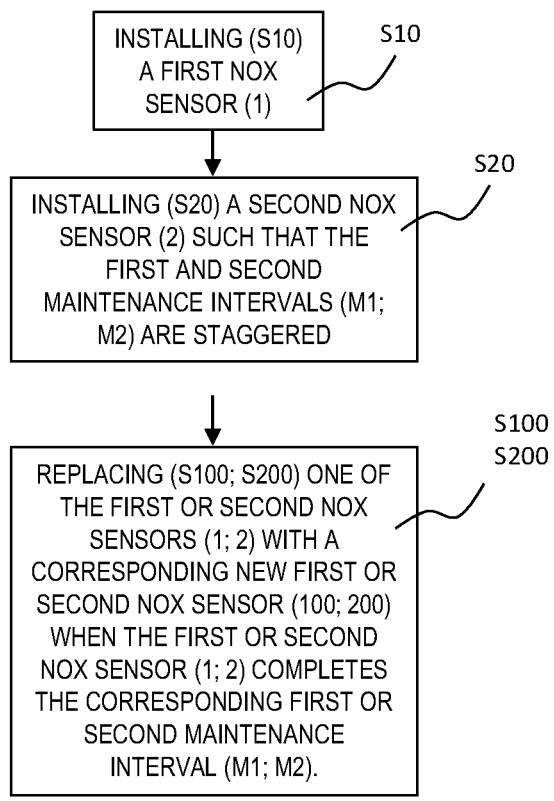
FIG. 4 schematically shows a flow diagram depicting a method according to a further embodiment.

Referring to FIG. 4, a schematic flow diagram is shown, illustrating a further embodiment of a method for monitoring measured NOx values in an exhaust system. In a step of replacing S100; S200, one of the first or second NOx sensors may be replaced with a corresponding new first or second NOx sensor 100; 200 when the first or second NOx sensor 1; 2 completes the corresponding first or second maintenance interval M1; M2. By that, the maintenance schedule of each of the NOx sensors present in the exhaust component 20 may be met. Accordingly, in the gas component 20, a NOx sensor present may be replaced by a new NOx sensor after completion of its maintenance interval M1; M2. Thereby, it may be achieved that regardless of how long the exhaust component remains in service, NOx values are always measured simultaneously by a dual sensor arrangement with an offset in maintenance interval according to the definition set forth above in the context of FIGS. 1 and 2. This excludes an initial condition where only one first NOx sensor 1 is present in the exhaust component 20. To this end, the first and second maintenance intervals M1; M2 each may comprise an identical number of operating hours. As an example, the number of operating hours in the first and/or the second maintenance intervals M1; M2 may each be 1000 h of operation.

In order to optimize the effect of dual NOx sensors 1; 2 monitoring measured NOx values, the maintenance timing offset $M_{off}$ may be one half of the first and/or second maintenance interval M1; M2. Further, the first and second NOx sensors 1; 2 may be installed at the same cross-section $C_{12}$ of an exhaust component 20 along an exhaust gas flow path 4 and/or are arranged within close proximity to one another. Hereto, it is also referred to FIG. 1.

Figure 5:
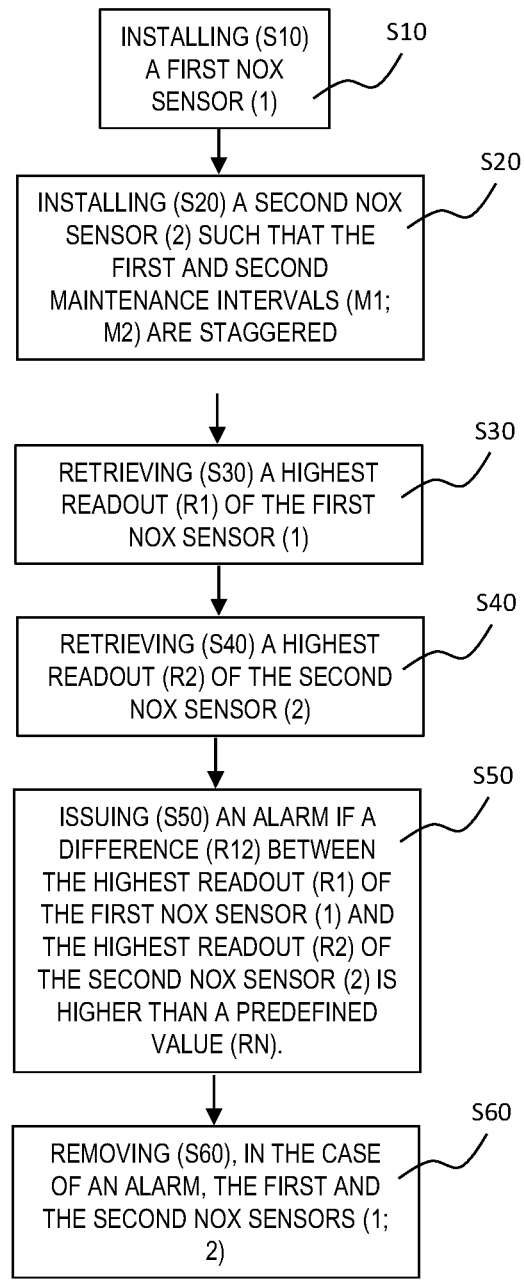
FIG. 5 schematically shows a flow diagram depicting a method according to a further embodiment.

With reference to FIG. 5, a further embodiment of a method for monitoring measured NOx values in an exhaust component 20 is illustrated by a schematic flow diagram. According to this embodiment, the method may further comprise the steps of retrieving S30 a highest readout $R_1$ of the first NOx sensor 1 and retrieving S40 a highest readout $R_2$ of the second NOx sensor 2 as an emission feedback.

In addition, the method may further comprise the step of issuing S50 an alarm if a difference $R_{12}$ between the highest readout $R_1$ of the first NOx sensor 1 and the highest readout $R_2$ of the second NOx sensor is higher than a predefined value RN. The method may further comprise the steps of removing S60, in the case of an alarm, the first and the second NOx sensors 1; 2.

The methods disclosed in FIGS. 3-5 may be combined. As an example, as a subsequent step after the method disclosed in FIG. 5, it may be possible to install S100 a new first NOx sensor 100 having a first predetermined maintenance interval M1 in an exhaust component 20 and installing S200 a new second NOx sensor 200 having a second predetermined maintenance interval M2 after the first new NOx sensor 100 has been operating for a predetermined operation duration $M_{off}$ such that the first and second maintenance intervals M1; M2 are staggered.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, there may be more than a first and second NOx sensors present in the exhaust component without departing from the disclosed teaching.

A system for monitoring measured NOx values in an exhaust component, comprising a first NOx sensor having a first predetermined maintenance interval and a second NOx sensor having a second predetermined maintenance interval may be provided. The system may comprise first and second NOx sensors which are configured such that their first and second maintenance intervals are staggered.

Thereby, the system provides a simple, cost-effective and reliable system for monitoring measured NOx values, which allows monitoring NOx values over a wide range of NOx concentration. In particular, the system may be equipped with several NOx sensors present in the exhaust component. Each added NOx sensor adds a further layer of safety due to NOx sensor redundancy and, if installed having a maintenance interval offset, each added NOx sensor may contribute in the validation of the further NOx sensor's outputs.

Due to the increased reliability of the system, the maintenance intervals of the individual NOx sensors may be increased.

In a further development, the first and second maintenance intervals may further be identical and a predetermined maintenance timing offset may be one half of the maintenance interval. When two NOx sensors are utilized, this embodiment represents the optimal system structure as throughout operation as the first and second maintenance intervals are staggered by 50%. Effectively, after every 50% of the maintenance interval, a new NOx sensor is introduced, providing NOx measurements with a high level of certainty and low risk of NOx sensor drift. Due to the increased reliability, the maintenance intervals of the individual NOx sensors may be increased. As an example, compared to a system having only one NOx sensor, the system according to the present disclosure may allow longer maintenance intervals for each individual NOx sensor without risking unnoticed NOx sensor drifts, as each NOx sensor output may be validated by the NOx sensor output of the other NOx sensor. To this end, theoretically, the maintenance intervals of each individual NOx sensors may be double the length of a maintenance interval of a NOx sensor in a solo-sensor arrangement.

In a further embodiment, the system may further comprise control means configured to issue an alarm if a difference between a highest readout of the first NOx sensor and a highest readout of the second NOx sensor is higher than a predefined value. To this end, the highest readouts of the dual NOx sensors may continuously be compared with each other and monitored with respect to NOx sensor drift. By issuing an alarm if a difference between a highest readout of the first NOx sensor and a highest readout of the second NOx sensor is higher than a predefined value, a dynamic monitoring of measured NOx values may be achieved over a wide range of NOx values. Thereby, a simple, cost-effective and reliable system for monitoring measured NOx values, which allows monitoring NOx values over a wide range of NOx concentration.

In a further embodiment, the first and second NOx sensors may be installed at a same cross-section of an exhaust component along an exhaust gas flow path and/or may be arranged within close proximity to one another. Therefore, the two different NOx sensors measure the same entity of exhaust gas flowing through the exhaust component.

In a further embodiment, the first and second NOx sensors may be installed downstream of a catalyst, preferably wherein the catalyst is a catalyst of the selective catalytic reduction SCR type. Alternatively, the first and second NOx sensors may also be installed downstream of a catalyst or even within a catalyst.

Further, a method for monitoring measured NOx values in an exhaust component may be provided, comprising the steps of installing a first NOx sensor having a first predetermined maintenance interval in an exhaust component, installing a second NOx sensor having a second predetermined maintenance interval after the first NOx sensor has been operating for a predetermined operation duration such that the first and second maintenance intervals are staggered. Thereby, a simple, cost-effective and reliable system for monitoring measured NOx values is provided, allowing monitoring NOx values over a wide range of NOx concentration. Preferably, the first and second maintenance intervals are staggered by a maintenance timing offset.

According to a further development, the method may further comprise the step of replacing one of the first or second NOx sensors with a corresponding new first or second NOx sensor when the first or second NOx sensor completes the corresponding first or second maintenance interval. Thereby, the staggered relationship between the first and second maintenance interval may be maintained after a NOx sensor completed its maintenance interval and needs to be replaced or refurbished. Preferably, the NOx sensor to be replaced is replaced by a NOx sensor of identical type or at least by a NOx sensor having the same maintenance interval. To this end, monitoring of measured NOx values in the exhaust component may be continued throughout the entire service life of the exhaust component.

In a further development, the first and second maintenance intervals may comprise an identical number of operating hours. According to a specific embodiment, the number of operating hours in the first and/or second maintenance intervals may be 3000 h. In principle, the maintenance timing offset may be one half of the first and/or second maintenance interval. By offsetting the maintenance timing, or, in other words, by offsetting the maintenance intervals, by one half of the first and/or second maintenance intervals, constant maintenance schedules may be achieved. According to this embodiment, the exhaust component needs to undergo maintenance every 500 h in order to replace a NOx sensor with a new NOx sensor. Alternatively, any other maintenance interval may be utilized.

In a further development, the first and second NOx sensors may be installed at the same cross-section of an exhaust component along an exhaust gas flow path and/or may be arranged within close proximity to one another. Thereby, the first and second NOx sensors measure the same entity of exhaust gas, which allows drawing a conclusion regarding the validity of the NOx sensor outputs.

According to a further development, the method may further comprise the steps of retrieving a highest readout of the first NOx sensor and retrieving a highest readout of the second NOx sensor as an emission feedback. The highest readout of the first and second NOx sensor allows implementing a simple post-processing routine to the measured data. Alternatively, the measured data may be filtered and/or post-processed in order to achieve a first and second readout of the respective NOx sensors.

In a further development, the method may further comprise the step of issuing an alarm if a difference between the highest readout of the first NOx sensor and the highest readout of the second NOx sensor is higher than a predefined value. Thereby, an additional safety layer may be implemented, allowing to detect NOx sensor drift at an early stage.

In a further development, the method may further comprise the steps of removing, in the case of an alarm, the first and the second NOx sensors. Removing both the first and the second NOx sensors may be required for two reasons. First, it is sometimes not clear which sensor is experiencing NOx sensor drift. Second, the alarm is likely to occur in between maintenance intervals of the compromised NOx sensor. Replacing just one NOx sensor prior to the completion of its maintenance interval would lead to inconsistent maintenance intervals, as the further NOx sensor's schedule would not be affected by the replacement of just one NOx filter. Accordingly, in the case of an alarm, the maintenance schedule for the exhaust component may be reset.

In a further development, the method may further comprise the steps of installing a new first NOx sensor having a first predetermined maintenance interval in an exhaust component and installing a new second NOx sensor having a second predetermined maintenance interval after the first new NOx sensor has been operating for a predetermined operation duration such that the first and second maintenance intervals may be staggered. Thereby, the maintenance schedule may be reset and the method according to the present disclosure may be started from the beginning again.

In a further development, the NOx sensors may be installed downstream of a catalyst, preferably wherein the catalyst may be a catalyst of the selective catalytic reduction SCR type. Alternatively, the first and second NOx sensors may also be installed downstream of a catalyst or even within a catalyst. Thereby, monitoring the measured NOx values may be conducted at any point of interest within the exhaust component.

In a further development, the second NOx sensor may be configured to be exposed to exhaust gas only for a predetermined duration in the second predetermined maintenance interval. Thereby, utilizing the second NOx sensor may be limited to certain operation times or operation cycles.

In a further embodiment, the second predetermined maintenance interval may contain more operating hours than the first predetermined maintenance interval. Vice versa, the first predetermined maintenance interval may contain more operating hours than the second predetermined maintenance interval. In general, having different maintenance intervals may lead to changed, hence irregular, maintenance cycles. The latter may be useful for synchronizing exhaust component maintenance cycles with maintenance cycles of other machine components. Alternatively, this may be useful for adjusting subsequent maintenance cycles to a foreseeable occupation of the system.

In a further embodiment, a readout of the second NOx sensor may be used to monitor the operability of the first NOx sensor. Likewise, a readout of the first NOx sensor may be used to monitor the operability of the second NOx sensor. The readouts of the first and/or second NOx sensors for monitoring the corresponding other NOx sensor may be highest readouts. Thus, it is possible to monitor a "used" NOx sensor by means of a knowingly "fresh" NOx sensor. Since both sensors measure exhaust gas at the same cross-section, a greater validity may be assigned the "fresh" NOx sensor due to its unused condition, which may then be used as a basis for a validation of the "used" NOx sensor. Thereby, operation safety may be improved further.

Accordingly, technical features which are described in connection with the above method may also relate and be applied to the proposed system, and vice versa.

INDUSTRIAL APPLICABILITY

With reference to the Figures, a system and a method for monitoring measured NOx values in an exhaust component as mentioned above is applicable in any suitable combustion engine, in particular turbo engines and internal combustion engines ICEs, for both liquid and gaseous fuels.

In practice, an engine, an exhaust used by the engine, an exhaust component, an exhaust system and/or any combination of these various assemblies and components may be manufactured, bought, or sold to retrofit an engine, or an engine already in the field in an aftermarket context, or alternatively, may be manufactured, bought, sold or otherwise obtained in an OEM (original equipment manufacturer) context.

As alluded to previously herein, the aforementioned embodiments may increase the life of the exhaust component and/or exhaust system while maintaining or even improving engine operation safety as will be elaborated further herein momentarily.

Referring to FIG. 1, there is an embodiment shown disclosing two NOx sensors with a different operation hour count. The latter is due to a predetermined offset between a first and a second maintenance interval. By that, not only two redundant NOx sensors are provided but in addition thereto, a dual sensor arrangement having different exposures to exhaust gas for each NOx sensor. So, one skilled in the art would expect that various embodiments of the present disclosure will have an improved accuracy, necessitating less maintenance and less complex NOx monitoring appliances over the life of the engine.

Similarly, FIG. 2 shows an illustration showing the intermittent and overlapping maintenance intervals at a consistent maintenance interval frequency. This indicates that due to the increased safety layer, the maintenance intervals for each individual NOx sensor may be longer, hence, allowing to substantially increase the life-span of the NOx sensor which is part of a system disclosed herein compared to a NOx sensor utilized in a solo-installation.

The same advantages apply to the methods disclosed in FIGS. 3-5.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

Certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for monitoring measured NOx values in an exhaust component, comprising a first NOx sensor having a first predetermined maintenance interval and a second NOx sensor having a second predetermined maintenance interval characterized in that
the first and second NOx sensors are configured such that their first and second maintenance intervals are staggered.

2. The system according to claim 1, wherein the first and second maintenance intervals are identical and a predetermined maintenance timing offset is one half of the maintenance interval.

3. The system according to claim 1, further comprising control means configured to issue an alarm if a difference between a highest readout of the first NOx sensor and a highest readout of the second NOx sensor is higher than a predefined value.

4. The system according to claim 1, wherein the first and second NOx sensors are installed at a same cross-section of an exhaust component along an exhaust gas flow path and/or are arranged within close proximity to one another.

5. The system according to claim 1, wherein the first and second NOx sensors are installed downstream of a catalyst, preferably wherein the catalyst is a catalyst of the selective catalytic reduction SCR type.

6. A method for monitoring measured NOx values in an exhaust component, comprising the steps of:
installing a first NOx sensor having a first predetermined maintenance interval in an exhaust component
installing a second NOx sensor having a second predetermined maintenance interval after the first NOx sensor has been operating for a predetermined operation duration such that the first and second maintenance intervals are staggered.

7. The method according to claim 6, further comprising the step of replacing one of the first or second NOx sensors with a corresponding new first or second NOx sensor when the first or second NOx sensor completes the corresponding first or second maintenance interval.

8. The method according to claim 6, wherein the first and second maintenance intervals comprise an identical number of operating hours.

9. The method according to claim 6, wherein the maintenance timing offset is one half of the first and/or second maintenance interval.

10. The method according to claim 6, wherein the first and second NOx sensors are installed at the same cross-section of an exhaust component along an exhaust gas flow path and/or are arranged within close proximity to one another.

11. The method according to claim 6, further comprising the steps of:
retrieving a highest readout of the first NOx sensor and retrieving a highest readout of the second NOx sensor as an emission feedback.

12. The method according to claim 11, further comprising the step of issuing an alarm if a difference between the highest readout of the first NOx sensor and the highest readout of the second NOx sensor is higher than a predefined value.

13. The method according to claim 12, further comprising the steps of removing, in the case of an alarm, the first and the second NOx sensors.

14. The method according to claim 6, wherein the NOx sensors are installed downstream of a catalyst, preferably wherein the catalyst is a catalyst of the selective catalytic reduction SCR type.

15. The method according to claim 6, wherein the second NOx sensor is configured to be exposed to an exhaust gas only for a predetermined duration in the second predetermined maintenance interval.

16. The method according to claim 6, wherein the second predetermined maintenance interval contains more operating hours than the first predetermined maintenance interval.

17. The method according to claim 6 wherein a readout of the second NOx sensor is used to monitor the operability of the first NOx sensor.

* * * * *